US010164870B2

(12) United States Patent
Hendel et al.

(10) Patent No.: US 10,164,870 B2
(45) Date of Patent: Dec. 25, 2018

(54) RELAXED ORDERING NETWORK

(71) Applicant: Avago Technologies International Sales Pte. Limited

(72) Inventors: Ariel Hendel, Cupertino, CA (US); Mohan Kalkunte, Saratoga, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 483 days.

(21) Appl. No.: 13/931,390

(22) Filed: Jun. 28, 2013

(65) Prior Publication Data
US 2015/0006749 A1    Jan. 1, 2015

(51) Int. Cl.
*H04L 12/707*    (2013.01)
*H04L 12/801*    (2013.01)

(52) U.S. Cl.
CPC .............. *H04L 45/24* (2013.01); *H04L 47/34* (2013.01)

(58) Field of Classification Search
CPC ................................ H04L 45/24; H04L 47/34
See application file for complete search history.

(56) References Cited

U.S. PATENT DOCUMENTS

| | | | | |
|---|---|---|---|---|
| 6,493,343 B1* | 12/2002 | Garcia | ................ | G06F 12/0292 370/394 |
| 8,014,317 B1* | 9/2011 | Ghosh | ................ | H04L 12/4633 370/254 |
| 2003/0069981 A1* | 4/2003 | Trovato | .................. | H04L 29/06 709/228 |
| 2003/0076831 A1* | 4/2003 | Van Doren | ....... | G06F 15/17375 370/394 |
| 2005/0047405 A1* | 3/2005 | Denzel | .................. | H04L 49/552 370/388 |
| 2005/0180327 A1* | 8/2005 | Banerjee | ................. | H04L 47/10 370/236 |
| 2008/0004957 A1* | 1/2008 | Hildreth | ............. | G06Q 30/0267 705/14.64 |
| 2014/0208152 A1* | 7/2014 | Magoshi | ................. | H04L 67/00 714/4.1 |

* cited by examiner

*Primary Examiner* — Michael A Keller
(74) *Attorney, Agent, or Firm* — Sterne, Kessler, Goldstein & Fox P.L.L.C.

(57) ABSTRACT

A system, method and a computer readable medium for processing packets transmitted using relaxed order in an ordered multi-path network are provided. Packets associated with a data flow from the ordered multi-path network are received out of order. The received packets are reassembled into a sequential order, without gaps, prior to being delivered to a protocol stock for sequential processing.

15 Claims, 8 Drawing Sheets

RELAXED ORDERING NETWORK

BACKGROUND

Field of Disclosure

The embodiments of disclosure relate to packet transmission in a network, and more specifically to relaxing packet order in an ordered network without affecting the transport layer or applications.

Related Art

Many server packet switched computer networks are suitable for cloud computing. In cloud computing, computing resources are delivered as a service over a packet switched computer network, such as, the Internet. The network requires a scalable server infrastructure that hosts traditional or distributed applications. Some applications typically execute on physical (or virtual) servers. These applications also rely on a network to communicate with other applications or network services that execute on different servers. Other applications may be distributed over multiple physical (or virtual) servers, and rely on a network to communicate with each other or access services on multiple servers.

A network fabric is a network topology where nodes, such as servers, send and transmit data packets using multiple switches. A data hop in a network occurs when a packet travels between two switches. An increase in capacity and workload demands on, a network require network fabrics that scale to large node counts without impacting the cost per server.

Conventionally, large multi-stage network fabrics interconnect physical server infrastructures. Example topologies for these networks are a mesh-like CLOS networks (a multi-stage network), or combinations of fat trees with single or dual homed sub-trees at the bottom tier networks. In these networks, there are multiple paths from, a source to a given endpoint or subnet. With increase in data traffic, networks require an effective way to load balance the data traffic across available paths.

A conventional approach to load balancing data traffic is based on equal cost multipath ("ECMP") routing. This approach is commonly implemented to balance Internet Protocol ("IP") data traffic, over a data center network, such as an L3 Data Center network. In the ECMP routing, a control plane provides "N" equivalent next hops to a given destination and the data plane chooses one next hop per packet while ensuring that consecutive packets of a given data flow use the same next hop. This type of load balancing is based on a hash function that hashes a number of immutable fields in the packet header. Because the hash function hashes immutable fields specific to a given data flow, different flows have uncorrelated next hop choices in a network, while a given flow stays on the same choice.

The limitation of a given data flow taking the same next hop (and eventually the same path) follows the universal constraint that packets in the data flow should not be reordered by the network. This constraint is inherent to a network where transport layers are inefficient at processing arbitrarily reordered packets. For instance, in a TCP/IP network, packets are associated with a sequence number. The source node sends packets, in consecutive order, to a destination node. The destination node sends an acknowledgment message to the source node each time it receives a packet with a consecutive sequence number. When a packet arrives out of order, e.g. a packet arrives with a non-consecutive sequence number at a destination node, the TCP layer interprets the packet gap as packet loss. This causes the destination node to send a message to the source node to retransmit the presumably missing packets, e.g. packets having the sequence numbers between the sequence number of the segment in the last sequentially received packet and the segment in the out-of-order packet.

When a source node receives repeated retransmission requests for the same packet, the source node interprets the repeated retransmission requests as network congestion. This causes the source node to unnecessarily retransmit packets that were not lost, but arrived out of order. This also causes a source node to reduce the congestion window as a way to alleviate the assumed congestion. The size of the congestion window determines a number of packets in the data flow that may be transmitted between a source node and destination node at a time. A reduced congestion window causes the source node to transmit fewer packets over a network at a time.

In a large network fabric, there may be multiple hops between the source and destination nodes. The cost of enforcing order at every hop is onerous, as hot spots may develop and queues build-up along specific paths, with the network not being able to load balance the data traffic load across unused links between the switches.

BRIEF SUMMARY

A system, method and a computer readable medium for processing packets transmitted using relaxed order in an ordered multi-path network are provided. The relaxed ordering constraint allows a network to load balance data traffic without data flow or temporal constraints. Packets associated with a data flow from the ordered multi-path network are received out of order. The received packets are reassembled into a sequential order, without gaps, prior to being delivered to a protocol stock for sequential processing.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 3A:
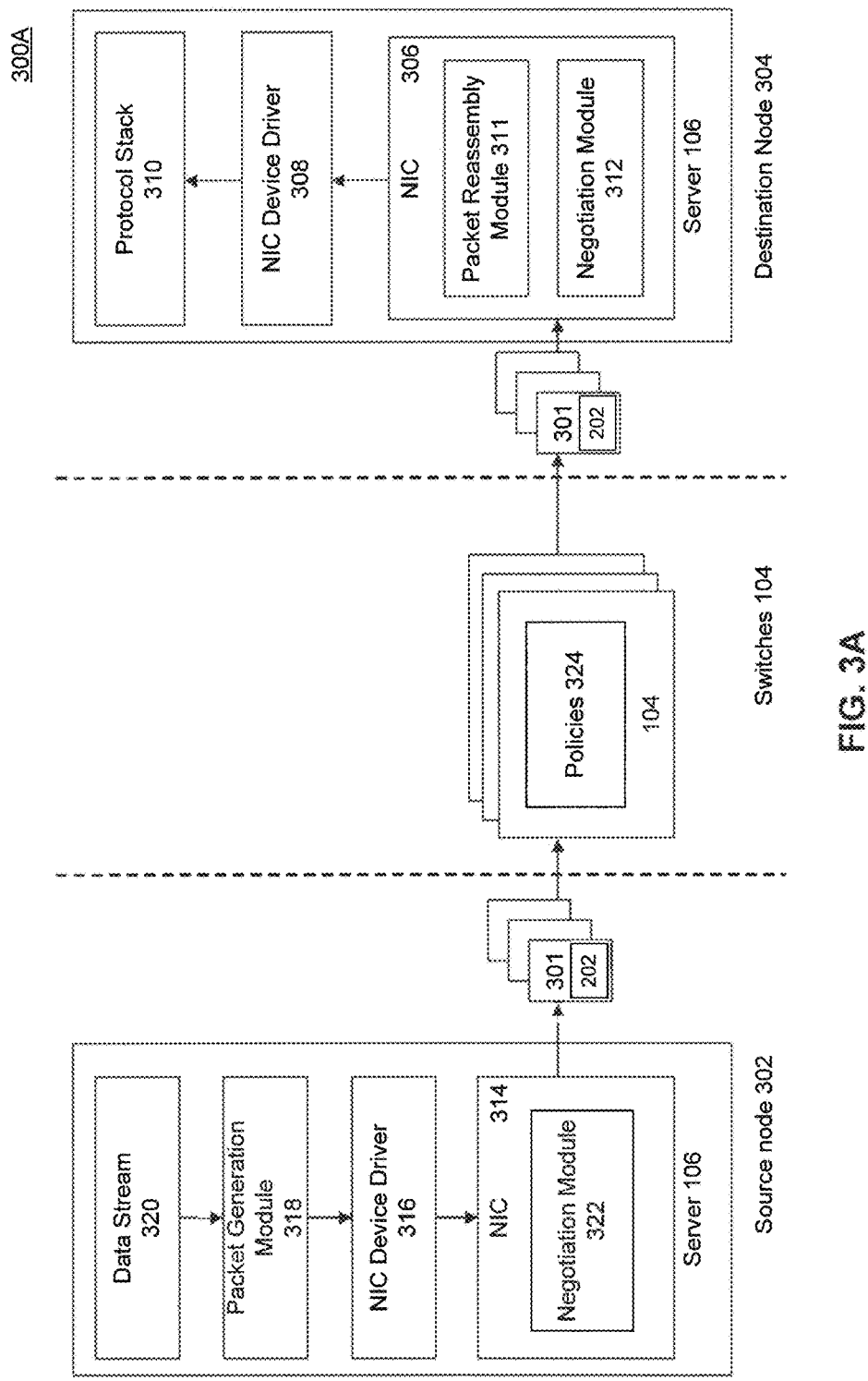
Figure 3B:
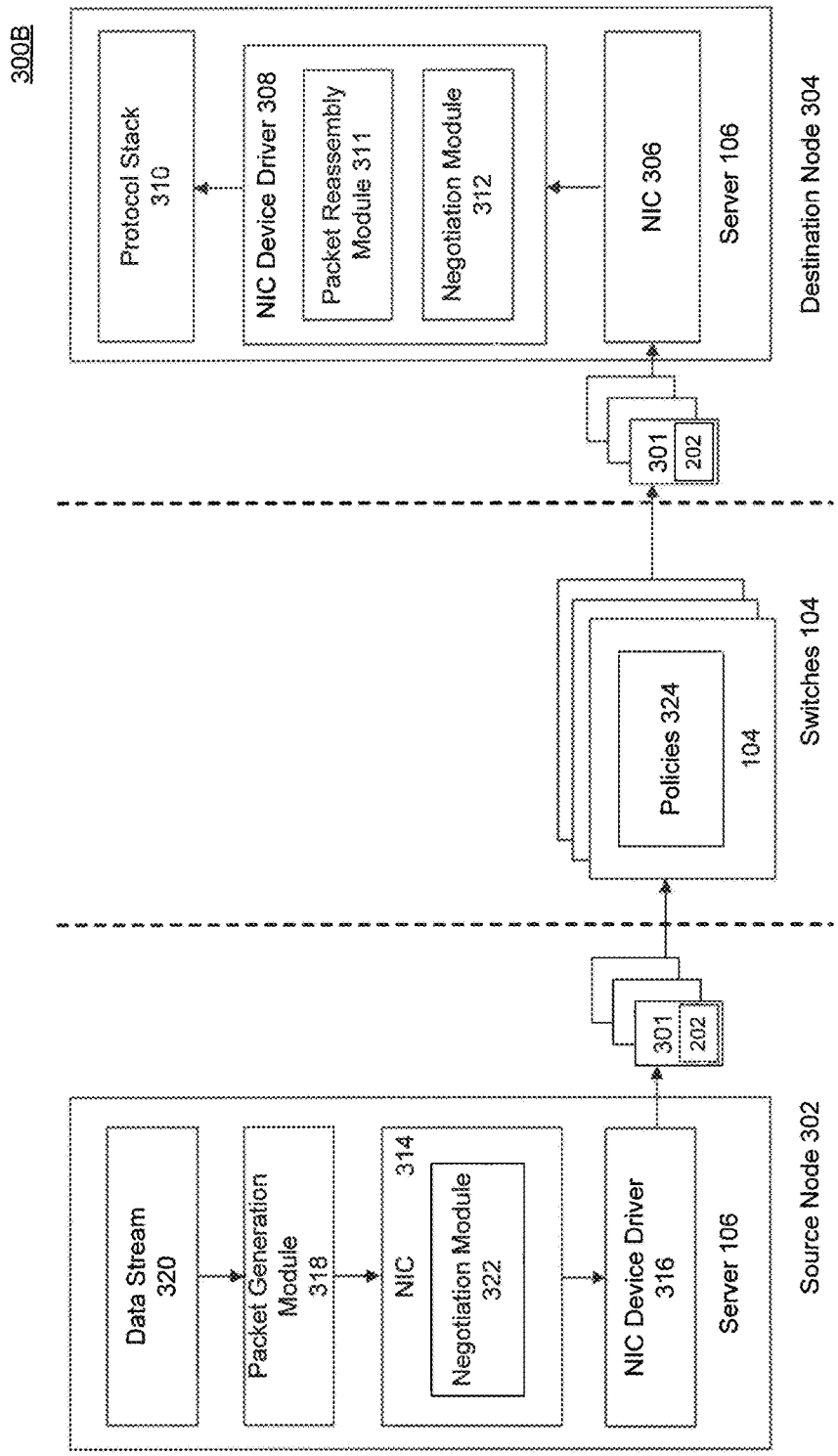

FIGS. 3A-B are block diagrams of a network that transmits packets using relaxed ordering, according to an embodiment.

Figure 4:
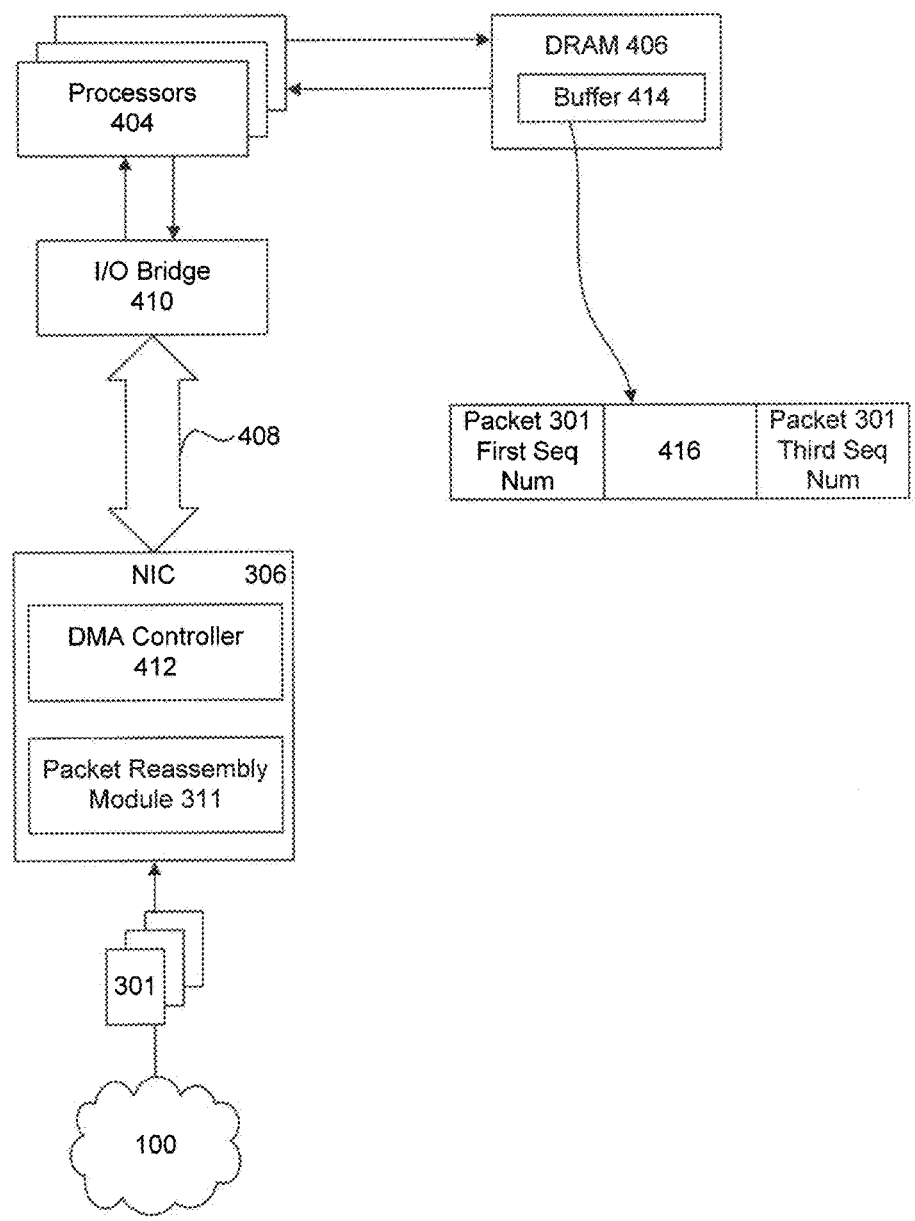

FIG. 4 is a block diagram of packet reassembly in a network mesh, according to an embodiment.

Figure 5:
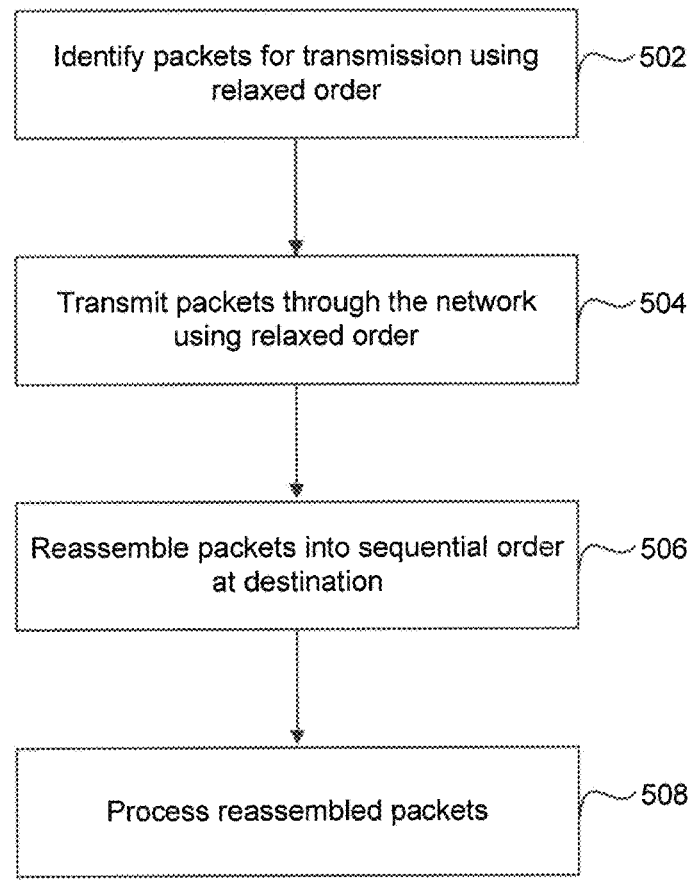

FIG. 5 is a flowchart of a method for transmitting packets using, relaxed order, according to an embodiment.

Figure 6:
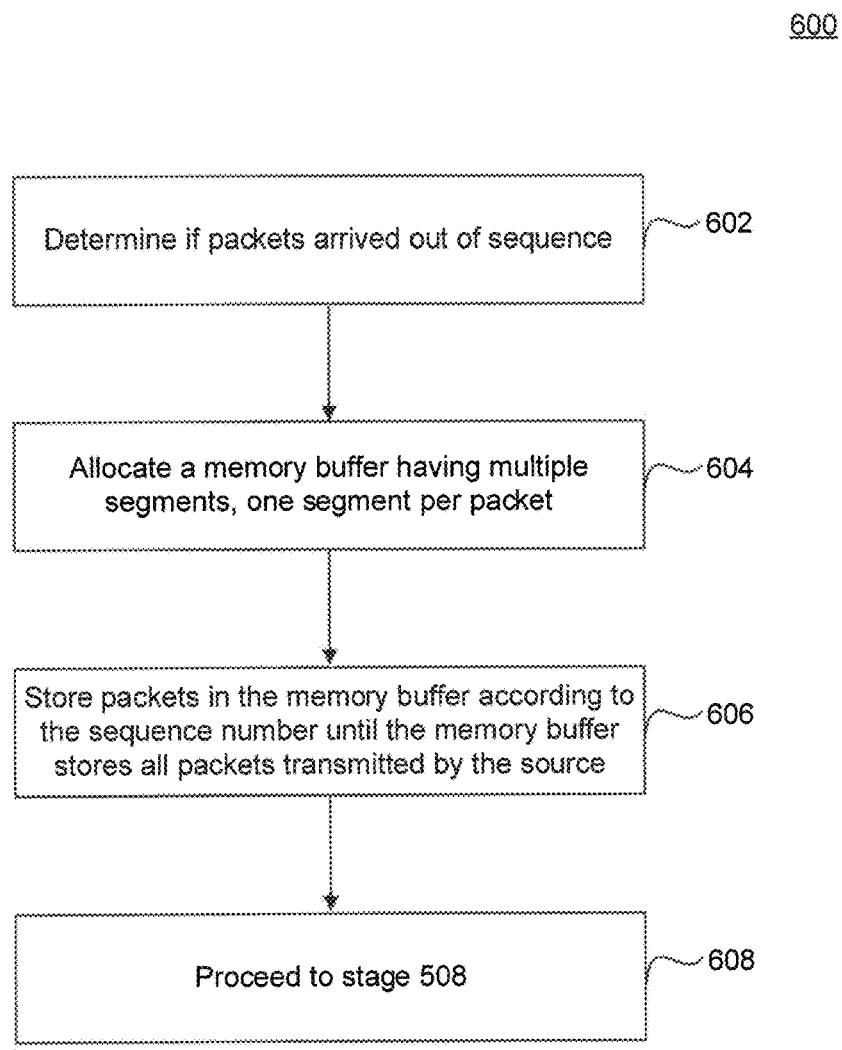

FIG. 6 is a flowchart of a method for reassembling packets, according to an embodiment.

Figure 7:
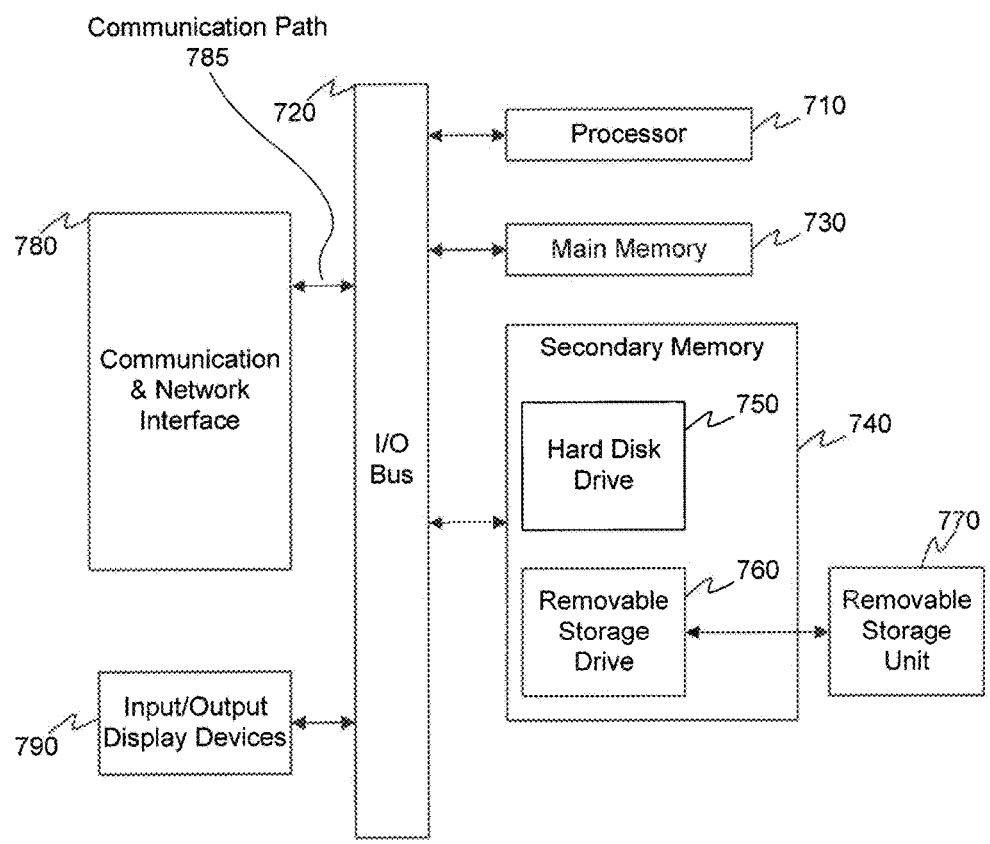

FIG. 7 is an example computer system in which the embodiments can be implemented.

The embodiments will be described with reference to the accompanying drawings. Generally, the drawing in which an element first appears is typically indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
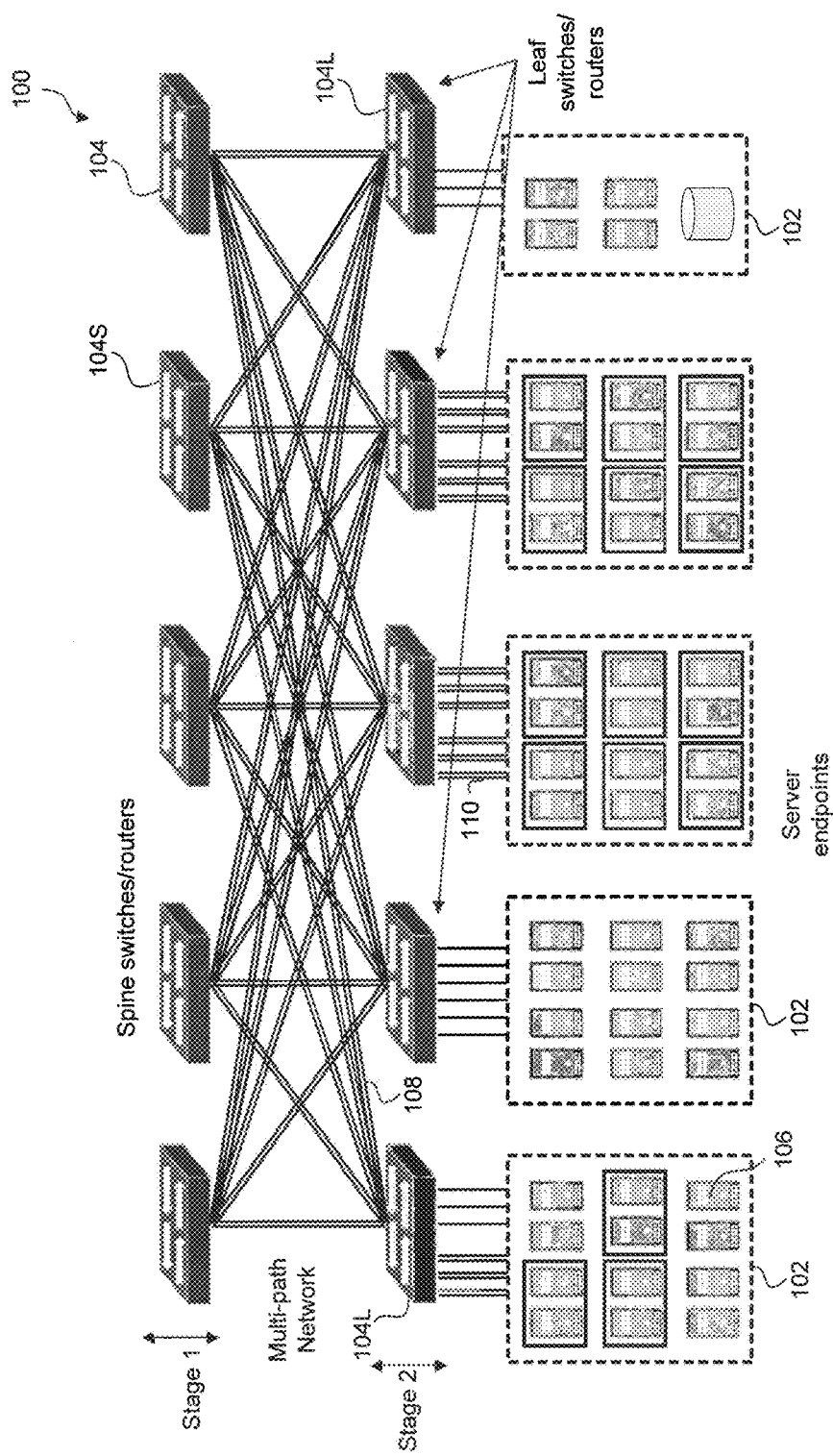
FIG. 1 is a block diagram of a packet switched network, according to an embodiment.

The embodiments of a disclosure show a novel endpoint behavior of network nodes that allows for relaxed ordering in a network without impact to the transport layer or applications. FIG. 1 is a block diagram of a packet switch network 100, according to an embodiment. Network 100 may be a mesh network, though an implementation is not limited to this embodiment. Network 100 connects multiple servers within a data center. A data center is a facility that includes multiple server racks 102 that include multiple servers 106. Servers 106 are computers that host computer systems that store data, execute applications, provide services to other computing devices, such as mobile devices, desktop devices, laptop devices, set-top boxes, other servers, etc. Example server 106 is included in FIG. 7.

In an embodiment, data centers may also include power supplies, communication connects, environment controls for the servers and cyber security devices, storage systems, etc.

Network 100 allows data traffic to travel between servers 106 in the same or different server racks 102. Example network 100 may be a CLOS network.

In an embodiment, network 100 includes multiple switches 104 that are connected by links 108. Switches 104 and links 108 connect servers 106 located in the same or different server racks 102 and allow for data to travel among servers 106. In a multi-stage network, switches 104 may be organized into multiple stages. Switches 104 that link to servers 106 are leaf switches 104L. Switches 104 that are at the topmost stage are spine switches 104S. When data traffic travels from one switch 104 to another switch 104 via link 108, it traverses between the stages. In an embodiment, data traffic may travel from server 106 to the associated leaf switch 104L through one or more stages that include switches 104 to spine switch 104S and then back down to another leaf switch 104L associated with another server 106. In this type of a configuration, data traffic may travel between the same number of switches 104 as it travels between any two servers 106.

Example network 100 in FIG. 1 includes two stages, stage 1 and stage 2. Stage 2 includes leaf switches 104L that connect and send data traffic from servers 106. Stage 1 includes spine switches 104S that receive data traffic from leaf switches 104L and transmit data traffic back to different leaf switches 104L that receive and propagate data traffic to servers 106.

Leaf switches 104L connect to servers 106 in server rack 102 and allow servers 106 to transmit and receive data traffic over network 100. Servers 106 within server rack 102, components or applications within servers 106 that send data may be referred to as source nodes and servers 106, components or applications within servers 106 that receive data are referred to as destination nodes. Each server 106 and its components or applications may typically act as both a source node and a destination node.

In an embodiment, leaf switches 104L connect to servers 106 using one or more links 110. For instance, link 110 may connect the network interface in switch 104L to the network interface included in server 106.

As discussed, links 108 transmit data traffic between multiple switches 104 as data traffic travels between two end points, such as, from a source node to a destination node. To avoid data traffic congestion at a particular switch 104, switches 104 may be configured to load balance data traffic. In load balancing, switch 104 splits data traffic among multiple different links 108 that connect to other switches 104. For example, data traffic that switch 104L receives from server 106 may be distributed to multiple switches 104 using multiple links 108. The distribution of data traffic to different switches 104 may be done using equal cost multipath ("ECMP") routing. In ECMP routing, data is divided into multiple packets and a hashing module (not shown) applies a hash function to one or more fields of the data in each packet. Example data fields may be immutable fields in the data header of each packet. This causes packets having different immutable fields to travel between switches 104 using different links 108, while packets having the same immutable fields to travel between switches 104 using the same links 108. In an embodiment, ECMP routing may be applied at some or all switches 104 until the data traffic arrives at a destination node. In an embodiment, switches 104 distribute data traffic to switches 104 such that data traffic from switch 104L connected to the source node reaches switch 104L connected to the destination node in equal number of hops, where a hop is a distance between two switches 104.

When conventional networks use ECMP load balancing, multiple packets may converge at a particular switch and cause a hot spot. For instance, a hot spot occurs when the hashing module applies the hash function to multiple packets having the same immutable fields, or different immutable fields that yield the same hash function result and multiple data packets are transmitted on the same output link and overload the switch. A hot spot may cause a source node to decrease the number of packets that it transmits or assume packet loss and retransmit congested packets.

In an embodiment, network 100 may transmit data traffic having multiple types. Example data traffic types may be Transmission Control Protocol and Internet Protocol (TCP/IP) and User Datagram Protocol (UDP) data traffic, though the implementation is not limited to these embodiments. Some data traffic types, such as TCP/IP, have a sequential packet ordering constraint that requires that packets be received sequentially. When a destination node receives an out of order TCP/IP packet, the destination node presumes packet loss. Other types of data traffic, such as UDP data traffic do not have a sequential packet constraint. Because sequential packet constraint is absent, the destination node may receive UDP packets in any order.

Figure 2:
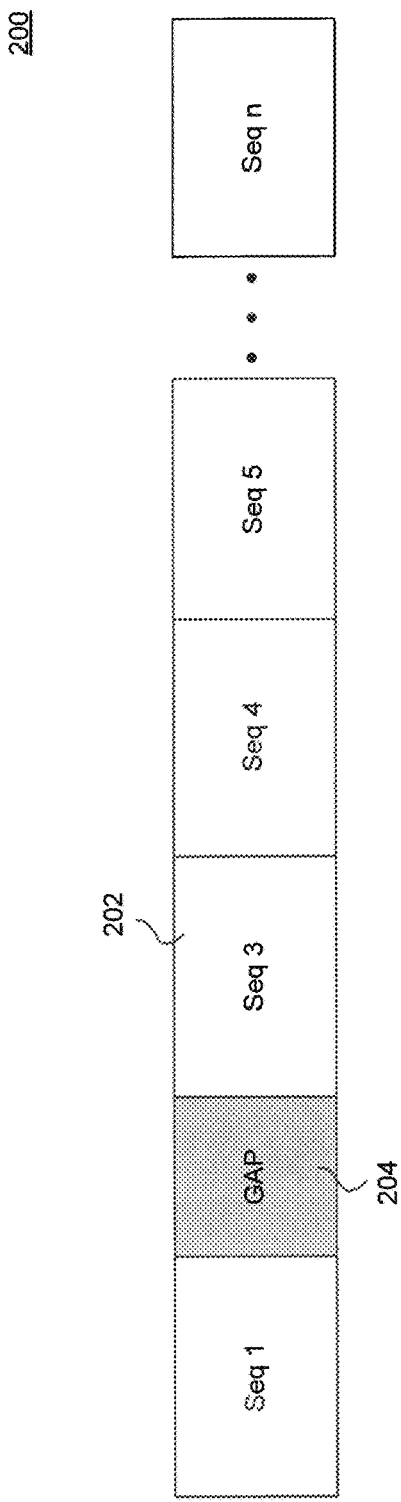
FIG. 2 is a diagram of a TCP flow associated with one direction of a TCP connection, according to an embodiment.

FIG. 2 is a diagram of a TCP flow 200 associated with one direction of a TCP connection, according to an embodiment. TCP flow 200 includes multiple bytes that are divided into segments 202. Segment 202 is appended with a header and is encapsulated into a packet. In an embodiment, a packet includes a header and segment 202, that are of predetermined sizes. Each segment 202 in a particular TCP flow 200 includes a sequence number. A sequence number may be from 0 to "n", where "n" is an integer, though segments 202 in different TCP flows 200 may have different sequence numbers. The header in a packet transporting segment 202 includes data, such as, an address of a destination node, and include mutable and immutable fields. When leaf switch 104L receives packets carrying respective segments 202 from a source node, leaf switch 104L may use ECMP routing to transmit the packets though switches 104 and to the destination node. As discussed above, ECMP ensures that packets that include segments 202 are transmitted sequentially from the source node to destination node using the same switches 104 and same links 108.

In an embodiment, a source node may transmit a configurable number of consecutive segments 202 to a destination node at a time. The configurable number of segments 202 may be based on the size of a "window" constraint. The window constraint identifies a number of segments 202 that may be transmitted to a destination node at a time, before the destination node transmits an acknowledgment message (also referred to as an ACK) to the source node. The ACK indicates to the source node that the destination node received a segment 202 having a particular sequence number.

In an embodiment, an ACK includes a next sequence number expected by the destination node. For example, suppose the source node transmits segments 202 having first, second and third sequence numbers to the destination node. If the destination node receives a segment having a first sequence number, the destination node transmits an ACK that contains the second sequence number, and so forth. When the destination node receives segment 202 having a third sequence number, when it expects a segment having a second sequence number, the destination node transmits an ACK to the source node that includes the second sequence number. Upon receipt, the source node determines that gap 204 has occurred. Because, in a sequential data transmission, gap 204 is indicative of a packet loss, the source node retransmits missing segment 202 having the second sequence number. In an embodiment, when the source node receives multiple ACKs that indicate gaps, the source node decreases the window constraint and transmits fewer segments 202 to the destination node as a way to reduce packet loss.

In unreliable networks, when a destination node receives segments out of order, a packet gap occurs and is indicative of packet loss and network congestion. However, in reliable networks, such as network 100, packet loss is infrequent. In network 100, the destination node may receive packets out of order due to network delay, rather than packet loss. As a result, the destination node in network 100 may wait for a packet with a particular segment 202 to arrive up to a configurable time interval. After the time interval expires, the destination node presumes packet loss.

In an embodiment, even though network 100 is an ordered network, network 100 may transmit packets between leaf switches 104L that connect to the source and destination nodes out of order, herein known as using relaxed order. While transmitting packets using relaxed order, network 100 maintains properties of an ordered network, as well as processing properties associated with the TCP/IP or another network protocol. To relax ordering, network 100 includes network interface controllers. In an embodiment, network interface controllers may include or communicate with software and hardware modules that are configured to relax packet ordering in network 100. Network processing controllers may be included within the source node and the destination node.

FIGS. 3A and 3B are block diagrams 300A and 300B of network 100 that transmit packets using relaxed reordering, according to an embodiment. In block diagram 300A, packet reordering may be performed in hardware, whereas in block diagram 300B packet reordering may be performed using software modules.

FIG. 3A includes a network interface controller (NIC) and a device driver at a source node 302 and a destination node 304. In FIG. 3A, source node 302 is a component or application in server 106 that generates and prepares packets 301 that include segments 202 for transmission in network 100. Destination node 304 is a component or application in server 106 that receives transmitted packets 301 that include segments 202 from network 100.

In an embodiment, NIC 306 is a piece of hardware within destination node 304 that receives packets 301 that include segments 202 that were transmitted through network 100. NIC 306 passes packets 301 that include segments 202 to NIC device driver 308. NIC device driver 308 is a software module that operates or controls NIC 306. In an embodiment, NIC device driver 308 communicates with NIC 306 using an I/O bus 408 (an input/output bus 408) discussed in FIG. 4. NIC device driver 308 may serve as a translator between NIC 306 and an operating system that executes on a computing device at destination node 304.

NIC device driver 308 retrieves packets 301 from NIC 304 and passes packets 301 to a protocol stack 310. Example protocol stack 310 is a kernel TCP/IP stack. Protocol stack 310 is a memory buffer stored in a volatile or non-volatile memory and accessed by a processor in a computing device at destination node 304. Both memory and processor are discussed in detail in FIG. 7. Protocol stack 310 stores packets 301 that include segments 202 until they are processed according to their protocol type and distributed to applications executing in servers 106. When protocol stack 310 receives packets 301 from NIC device driver 308, there is a presumption that packets include segments 202 are ordered sequentially, according to segment sequence numbers.

When packets 301 are transmitted in network 100 using relaxed ordering, packets 301 are reassembled at NIC 306 to give protocol stack 310 an illusion that packets 301 were received sequentially. In an embodiment, to reassemble packets 301 that include segments 202, NIC 306 includes a packet reassembly module 318. Packet reassembly module 311 reassembles packets 301 that require reassembly according to segment sequence number. FIG. 4, below, discusses packet reassembly, in detail, according to an embodiment.

In an embodiment, NIC 306 includes a negotiation module 312. Negotiation module 312 negotiates with source node 302 as to which packets 301 may be transmitted using a relaxed ordering or a conventional sequential approach. In one embodiment, negotiation module 312 may negotiate that packets 301 transmitted using a particular protocol be transmitted using relaxed ordering. In another embodiment, negotiation module 312 may negotiate such that packets 301, which are transmitted from a list of Internet Protocol (IP) addresses, may be transmitted using relaxed ordering. For example, packets 301 that are transmitted using TCP/IP typically require sequential ordering. For some TCP/IP packets, negotiation module 312 may negotiate relaxed ordering transmission with source node 302 based on negotiation credentials, such as the IP address associated with source node 302 or other configurable criteria. However, TCP/IP packets for which negotiation module 312 did not negotiate packet reassembly are transmitted using a conventional sequential approach. When negotiation module 312 negotiates relaxed ordering, packets 301 may be tagged for relaxed ordering transmission, as discussed below.

When packet reassembly module 311 receives packets 301 that include segments 202, packet reassembly module 311 determines whether packets 301 were transmitted using a conventional approach or relaxed ordering. For example, packet reassembly module 311 may determine the protocol associated with the packet 301. For example, packets 301 may be transmitted using User Datagram Protocol ("UDP"). UDP packets may be transmitted using relaxed ordering as applications that send or receive UDP packets do not expect UDP packets to arrive in sequence. When packets 301 are UDP packets, packet reassembly module 311 propagates packets 301 to protocol stack 310 because UDP packets may be processed in a non-sequential manner. In another example, packet reassembly module 311 may determine whether negotiation module 312 has negotiated for packets 301 having a particular protocol for being transmitted using relaxed ordering. Also, when packets 301 are a TCP/IP packet, packet reassembly module 311 determines whether packets 301 were transmitted from an IP address that has negotiated for relaxed ordering. If packets 301 were transmitted using relaxed ordering, packet reassembly module 311 reassembles the data flow associated with packets 301 prior to transmitting packets to protocol stack 310. If packets 301 were transmitted using a conventional ordering approach, packet reassembly module 311 presumes sequential ordering and transmits packet 301 to protocol stack 310 without reassembly.

In an embodiment, source node 302 includes a network interface controller 314 and a NIC device driver 316. In an embodiment, NIC 314 is a piece of hardware within source node 302 that transmits packets 301 over network 100. NIC device driver 316 is a software module that operates or controls NIC 314. For example, NIC device driver 316 receives packets 301 from a packet generation module 318, and propagates packets 301 to NIC 314.

In an embodiment, packet generation module 318 is located within source node 302. Packet generation module 318 receives a data stream 320 from servers 106 and divides data stream 320 into data flows that include multiple segments 202. In an embodiment, the size of a data flow is configurable. In an embodiment, packet generation module 318 also assigns a sequence number to each segment 202. In a further embodiment, packet generation module 318 generates segments 202 having the same size. In yet another embodiment, data flow may include a configurable number of segments 202. Once packet generation module 318 generates segments 202, packet generation module 318 appends a header to each segment 202 and generates packet 301.

NIC 314 also includes a negotiation module 322. Negotiation module 322 negotiates which data flows may be transmitted over network 100 using a relaxed order or a conventional sequential order. For example, as discussed above, TCP/IP data flows may be transmitted over network 100 using a relaxed order. To transmit data flows using a relaxed order, negotiation module 322 may tag packets 301 in the data flow for transmission using relaxed order. At destination node 304, packet reassembly module 311 may check the tag in packets 301 and determine whether packet reassembly is required. In an embodiment, negotiation module 322 may insert a tag into a header of packet 301.

In another example, negotiation module 322 may pass information regarding the processing of packets 301 using relaxed order when it establishes a connection with switch 104 at the next stage as packet 301 travels to network spine. For example, negotiation module 322 may exploit a three way handshake when establishing a connection between switch 104 and another switch 104. A three way handshake is a three way message relay between two end points in a network that sets parameters for communications channels between these end points. Example parameters may include a bit transfer rate, quality of service, packet ordering, etc. As part of the set of parameters, negotiation module 322 may include a parameter associated with a relaxed order. Switch 104 then transmits packets to switch 104 according to the established parameters.

In an embodiment, switch 104 may use policies 324 to determine whether to transmit packets 301 using relaxed order. Policies 324 may be stored in a memory of switch 104, such as memory described in detail in FIG. 7. Policies 324 may determine whether switch 104 should propagate some or all packets 301 using relaxed order. When switch 104 receives packets 301, switch 104 may access a tag in packets 301 inserted by negotiation module 322, and compare the tag against policies 324. Based on the comparison, switch 104 may propagate packets 301 to another switch 104 or leaf switch 104L associated with the destination node using relaxed order or using a conventional hash function that generates a preset path to the same leaf switch 104L. In another embodiment, switch 104 may compare a parameter received via a three way handshake to determine whether to propagate packets 301 using a relaxed order.

In an embodiment, policies 324 may be configured by a network administrator.

In an embodiment, network 100 may also use relaxed ordering in a stateless manner. For example, policies 324 in switches 104 may store IP addresses or network protocols that may be transmitted using a relaxed order. In this embodiment, negotiation modules 312 and 322 need not negotiate a relaxed order, as switches 104 may check the IP address or a network protocol type against policies 324 that are stored in the associated memory.

In an embodiment, when switch 104 determines packets 301 that may be transmitted using a relaxed order, switch 104 may apply several algorithms for determining, the next hop for packets 301. In one embodiment, switch 104 may randomly select the next switch 104 from a list of available switches 104. In another embodiment, switch 104 may use a round robin algorithm to select the next switch 104. In another embodiment, switch 104 may select the next switch 104 based on the available queue length of a queue that stores packets 301 at switch 104 before packets 301 are propagated to another switch 104. This type of selection may favor shorter queue lengths. In yet another embodiment, switch 104 may select the next switch 104 based on the buffer availability of the next switch 104. The buffer availability may be associated with the traffic congestion on the next switch 104.

As discussed above, FIG. 3B is a block diagram 300B of network 100 where reordering may be performed in software, according to an embodiment. In this embodiment, packet reassembly module 311 and negotiation module 312 are located within NIC device driver 308. Additionally, negotiation module 322 is located within NIC device driver 316.

FIG. 4 is a block diagram 400 of packet reassembly, according to an embodiment. In block diagram 400, packet reassembly module 311 is included within NIC 306. However, as discussed above, packet reassembly module 311 may also be included within NIC device driver 308.

In block diagram 400, NIC 306 or NIC device driver 308 execute on a computing device, that may include components of a computing device discussed in FIG. 7. A computing device includes one or more processors 404 that execute instructions generated by packet reassembly module 311. Processors 404 are associated with one or more memories 406, such as a volatile memory for storing temporary data associated with packet reassembly module 311. Example embodiments of processor 404 and memory 406 are discussed in detail in FIG. 7. A computing device may execute functions associated with the processing of packets 301 at destination node 304.

An I/O bus 408 passes instructions and data between NIC 306, processor 404 and memory 406. An example I/O bus, such as I/O bus 408 is discussed in detail in FIG. 7.

In an embodiment, a computing device also includes an I/O bridge 410. I/O bridge 410 determines which processors 404 may process instructions from packet reassembly module 311 on a computing device that has multiple, processors 404.

When packets 301 arrive at destination node 304, packet reassembly module 311 identifies packets 301 that are transmitted using relaxed order. Packets 301 that were transmitted using the conventional sequential approach are forwarded to protocol stack 310, as discussed above. Packet reassembly module 311 identifies whether gaps exist in packets 301 associated with a particular data flow. In an embodiment, gaps may be identified using a gap in a sequence number associated with segment 202 of each packet 301.

When packet reassembly module 311 identifies a gap in packets that include segments 202, packet reassembly module 311 stores packets 301 in memory 406 until missing packets arrive at destination node 304. For example, packet reassembly module 311 may use a direct memory access (DMA) controller 412 included in NIC 306 to store packets 301 in memory 406. DMA controller 412 provides access to memory 406 by NIC 306.

To store packets 301 in memory 406, DMA controller 412 accesses read and/or write access memory 406 without interrupting processor 404.

In an embodiment, DMA controller 412 may also execute within device driver 308.

DMA controller 412 allocates buffer 414 in memory 406. In an embodiment, the buffer size of buffer 414 is based on the size of the data flow. Buffer 414 stores packets 301 in a sequential order, according to the sequence number of the segment 202. Because the size of packets 301 is known, DMA controller 412 allocates a memory segment for each packet 301 based on the packet's size. Each time a non-sequential packet 301 from data flow arrives at destination node 304, DMA controller 412 stores the non-sequential packet 301 in a corresponding memory segment of buffer 414 that is associated with the packet's sequence number, and leaves gaps for packet(s) 301 that have not yet arrived at destination node 304.

For example, suppose NIC 306 expects a data flow that includes three packets 301 that include segments 202 having first, second and third sequence numbers. The data flow was transmitted using relaxed order. First, NIC 306 receives packets 301 that include segments 202 having first and second sequence numbers. NIC 306 forwards the received packets 301 to packet reassembly module 311. Packet reassembly module 311 identifies the sequence number gap in packets and instructs DMA controller 412 to allocate buffer 414 in memory 406 that has three memory segments, one memory segment per packet. DMA controller 412 then stores packets that include segments 202 having, first and third sequence numbers in the first and third memory segments in buffer 414, as shown in FIG. 4, while leaving a gap 416 in the second segment for packet 301 that includes segment 202 having a second sequence number. When NIC 306 receives packet 301 that includes segment 202 having a second sequence number, packet reassembly module 311 causes DMA controller 412 to store packet 301 that includes segment 202 having a second sequence number in the second memory segment in buffer 414. When buffer 414 stores all packets 301 that include segments 202 in sequence, processor 404 retrieves packets 301 that include segments 202 having first, second and third sequence numbers from buffer 414 and transmits them to protocol stack 310.

In an embodiment, packets 301 that include segments 202 in a data flow may not arrive at destination 304 due to packet loss. To prevent packets 301 being stored in buffer 414 indefinitely, packets 301 may be transmitted to protocol stack 310 after being stored in buffer 414 for a configurable amount of time.

FIG. 5 is a flowchart of a method 500 for transmitting packets using relaxed order, according to an embodiment.

At stage 502, packets for transmission using relaxed order are identified. For example, source node 302 identifies a data stream for transmission to destination node 304. After packet generation module 318 divides the data stream in segments 202, and generates packets 301 that include segments 202, NIC 314 within the source node identifies and tags packets 301 for transmission using relaxed order. As discussed above, in one embodiment, negotiation module 322 may insert a tag into the header of one or more packets 301 so that the tag identifies packets 301 that may be transmitted using a relaxed order. In another embodiment, negotiation module 322 may include a parameter in a three-way handshake. When leaf switch 104L associated with the source node uses the parameter received in the three-way handshake to establish a connection using relaxed order with the next switch 104. In yet another embodiment, packets 301 may be slated for a relaxed order transmission based on their network protocol or IP address.

At stage 504, packets are transmitted in a network using relaxed order. For example, as packets 301 travel in network 100 through multiple switches 104, switches 104 determine whether packets 301 may be transmitted using relaxed order based on the included tag or a parameter discussed above. Switches 104 may compare the tag or parameter against polices 324 stored in switches 104 that identify whether packets may be sent using static or relaxed order, or make the determination based on the network protocol or IP address associated with packets 301. When each switch 104 identifies that packets 301 may be transmitted using a relaxed order, switches 104 use one or more relaxed order methodologies, such as random selection of the next switch 104, round robin selection of the next switch 104, next hot buffer availability of next switch 104, etc., to propagate individual packets 301 though multiple switches 104 to the leaf switch 104 associated with the destination node.

At stage 506, packets are reassembled at the destination. For instance, NIC 306 at destination node 304 identifies packets 301 that were transmitted using relaxed order based on an inserted tag, protocols, etc. Once identified, NIC 306 uses, packet reassembly module 311 to reassemble packets according to their sequence numbers. In an embodiment, some packets 301 transmitted using relaxed order, such as UDP packets, do not require reassembly and, are forwarded to stage 508. Packet reassembly is discussed in detail above and in FIG. 6.

At stage 508, packets are processed. For example, reassembled packets 301 are forwarded to protocol stack 310 that processes packets 301. As part of the processing, the kernel that retrieves packets 301 from protocol stack 310 transmits an ACK message to the source node that transmitted packets 301.

FIG. 6 is a flowchart of a method 600 for reassembling packets, according to an embodiment.

At stage 602, a determination is made whether packets arrived out of sequence. For example, packet reassembly module 311 determines whether packets that include segments 202 arrived sequentially. If packets 301 arrived out of sequence, packet reassembly module 311 uses DMA controller 412 to store packets 301 in an associated memory.

At stage 604, a memory buffer is allocated. For example, DMA controller 412 allocates buffer 414 that stores packets having respective segments 202. Buffer 414 stores packets 301 according to the segment's sequence number. For example, buffer 414 is divided into multiple memory segments or portions, where each memory segment stores a packet that includes a segment 202 with a particular sequence number.

At stage 606, packets are stored in the memory buffer. For example, DMA controller 412 stores each packet 301 in a memory segment associated with the segment 202's sequence number. If a packet that includes segment 202 having a particular sequence number is missing, the memory segment is left blank until packet reassembly module 311 receives the missing packet. Upon receipt, the out-of-sequence packet that includes segment 202 is stored in the associated memory segment in buffer 414. Stage 606 continues until buffer 414 stores all packets transmitted in a data flow from source node 302.

At stage 608, the flowchart proceeds to stage 508.

Various aspects of the disclosure can be implemented by software, firmware, hardware, or a combination thereof. FIG. 7 illustrates an example computer system 700 in which the embodiments, or portions thereof, can be implemented. For example, the methods illustrated by flowcharts described herein can be implemented in system 700. Various embodiments of the disclosure are described in terms of this example computer system 700. After reading this description, it will become apparent to a person skilled in the relevant art how to implement the disclosure using other computer systems and/or computer architectures.

Computer system 700 includes one or more processors, such as processor 710. Processor 710 can be a special purpose or a general purpose processor. Processor 710 is connected to a communication infrastructure 720 (for example, a bus or network).

Computer system 700 also includes a main memory 730, preferably random access memory (RAM), and may also include a secondary memory 740. Secondary memory 740 may include, for example, a hard disk drive 750, a removable storage drive 760, and/or a memory stick. Removable storage drive 760 may comprise a floppy disk drive, a magnetic tape drive, an optical disk drive, a flash memory, or the like. The removable storage drive 760 leads from and/or writes to a removable storage unit 770 in a well-known manner. Removable storage unit 770 may comprise a floppy disk, magnetic tape, optical disk, etc. which is read by and written to by removable storage drive 760. As will be appreciated by persons skilled in the relevant art(s), removable storage unit 770 includes a computer usable storage medium having stored therein computer software and/or data.

In alternative implementations, secondary memory 740 may include other similar means for allowing computer programs or other instructions to be loaded into computer system 700. Such means may include, for example, a removable storage unit 770 and an interface (not shown). Examples of such means may include, a program cartridge and cartridge interface (such as that found in video game devices), a removable memory chip (such as an EPROM, or PROM) and associated socket, and other removable storage units 770 and interfaces which allow software and data to be transferred from the removable storage unit 770 to computer system 700.

Computer system 700 may also include a communications and network interface 780. Communication and network interface 780 allows software and data to be transferred between computer system 700 and external devices. Communications and network interface 780 may include a modem, a communications port, a PCMCIA slot and card, or the like. Software and data transferred via communications and network interface 780 are in the form of signals which may be electronic, electromagnetic, optical, or other signals capable of being received by communication and network interface 780. These signals are provided to communication and network interface 780 via a communication path 785. Communication path 785 carries signals and may be implemented using wire or cable, fiber optics, a phone line, a cellular phone link, an RF link or other communications channels.

The communication and network interface 780 allows the computer system 700 to communicate over communication networks or mediums such as LANs, WANs the Internet, etc. The communication and network interface 780 may interface with remote sites or networks via wired or wireless connections.

In this document, the terms "computer program medium" and "computer usable medium" and "computer readable medium" are used to generally refer to media such as removable storage unit 770, removable storage drive 760, and a hard disk installed in hard disk drive 750. Signals carried over communication path 785 can also embody the logic described herein. Computer program medium and computer usable medium can also refer to memories, such as main memory 730 and secondary memory 740, which can be memory semiconductors (e.g. DRAMs, etc.). These computer program products are means for providing software to computer system 700.

Computer programs (also called computer control logic) are stored in main memory 730 and/or secondary memory 740. Computer programs may also be received via communication and network interface 780. Such computer programs, when executed, enable computer system 700 to implement embodiments of the disclosure as discussed herein. In particular, the computer programs, when executed, enable processor 710 to implement the processes of the disclosure, such as the steps in the methods illustrated by flowcharts discussed above. Accordingly, such computer programs represent controllers of the computer system 700. Where the disclosure is implemented using software, the software may be stored in a computer program product and loaded into computer system 700 using removable storage drive 760, hard drive 750 or communication and network interface 780, for example.

The computer system 700 may also include input/output/display devices 790, such as keyboards, monitors, pointing devices, etc.

The disclosure is also directed to computer program products comprising software stored on any computer useable medium. Such software, when executed in one or more data processing device(s), causes a data processing device(s) to operate as described herein. Embodiments of the disclosure employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Embodiments in the disclosure can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in, light of the teachings and guidance.

The breadth and scope of the embodiments should not be limited by any of the above-described exemplary embodiments, but should be defined only in accordance with the following claims and their equivalents.

What is claimed is:

1. A network interface controller for processing packets arranged in a sequential packet order before transmission over an ordered multi-path network, the network interface controller comprising:
    a negotiation module configured to negotiate, with a data flow source, packets that are to be transmitted in a data flow through the ordered multi-path network using a relaxed order that differs from the sequential packet order; and
    a packet reassembly module configured to:
        receive the packets transmitted in the data flow through the ordered multi-path network in the relaxed order; and
        reassemble the packets received in the relaxed order into the sequential packet order prior to delivering the packets having the sequential packet order for sequential processing;
    wherein the negotiation module is configured to determine during the negotiation whether the data flow source has an Internet Protocol (IP) address on a list of IP addresses that are predetermined to communicate packets using the relaxed order, and
    wherein the IP address on the list of IP addresses indicates that the data flow source operates according to a TCP/IP protocol that can be negotiated to communicate packets using the relaxed order.

2. The network interface controller of claim 1, wherein the packet reassembly module is configured to:
    identify a sequence number gap in sequence numbers of the packets received in the relaxed order, wherein the sequence number gap indicates one or more packets in the data flow that have not arrived through the ordered multi-path network;
    store the packets received in the relaxed order in a memory buffer according to the sequence numbers leaving a gap in the memory buffer for the one or more packets with sequence numbers in the sequence number gap; and
    deliver the packets having the sequential packet order stored in the memory buffer when the one or more packets with the sequence numbers in the sequence number gap have been received by the packet reassembly module and stored in the memory buffer.

3. The network interface controller of claim 1, wherein the packet reassembly module is further configured to:
    determine whether the packets received in the relaxed order require reassembly based on a tag, protocol type or negotiation credentials; and
    reassemble the packets received in the relaxed order into the sequential order based on the determination.

4. The network interface controller of claim 1, wherein packets received in the relaxed order are associated with a tag that indicates that the packets received in the relaxed order require reassembly.

5. A method for processing packets arranged in a sequential packet order before transmission over an ordered multi-path network, the method comprising:
  negotiating, using a network interface controller, with a data flow source, packets that are to be transmitted in a data flow through the ordered multi-path network using a relaxed order that differs from the sequential packet order;
  receiving, at the network interface controller, the packets transmitted in the data flow through the ordered multipath network in the relaxed order; and
  reassembling, using the network interface controller, the packets received in the relaxed order into the sequential packet order prior to delivering the packets having the sequential packet order for sequential processing;
  wherein the negotiating includes determining whether the data flow source has an Internet Protocol (IP) address on a list of IP addresses that are predetermined to communicate packets using the relaxed order, and
  wherein the IP address on the list of IP addresses indicates that the data flow source operates according to a TCP/IP protocol that can be negotiated to communicate packets using the relaxed order.

6. The method of claim 5, wherein the reassembling further comprises:
  identifying a sequence number gap in sequence numbers of the packets received in the relaxed order, wherein the sequence number gap indicates one or more packets in the data flow that have not arrived through the ordered multi-path network;
  storing the packets received in the relaxed order in a memory buffer according to the sequence numbers of the packets received in the relaxed order leaving a gap in the memory buffer for the one or more packets having sequence numbers in the sequence number gap; and
  delivering packets having the sequential packet order stored in the memory buffer when the one or more packets with the sequence numbers in the sequence number gap have been received by the packet reassembly module and stored in the memory buffer.

7. The method of claim 5, further comprising:
  determining whether the packets received in the relaxed order require reassembly based on a tag, protocol type or negotiation credentials, and
  wherein the reassembling comprises:
  reassembling the packets received in the relaxed order into the sequential order based on the determination.

8. The method of claim 5, wherein the packets received in the relaxed order are associated with a tag that indicates that the packets received in the relaxed order require reassembly.

9. A system for processing packets arranged in a sequential packet order before transmission over an ordered multi-path network, the system comprising:
  a memory that stores one or more instructions;
  one or more processors configured to execute the one or more instructions, the one or more instructions, when executed by the one or more processors, configuring the one or more processors to:
  negotiate, with a data flow source, the packets to be transmitted in a data flow through the ordered multi-path network using a relaxed order that differs from the sequential packet order, wherein the negotiation includes determining whether the data flow source has an Internet Protocol (IP) address on a list of IP addresses that are predetermined to communicate packets using the relaxed order, wherein the IP address on the list of IP addresses indicates that the data flow source operates according to a TCP/IP protocol that can be negotiated to communicate packets using the relaxed order;
  receive the packets transmitted in the data flow through the ordered multi-path network in the relaxed order, and
  reassemble the packets received in the relaxed order into the sequential packet order prior to delivering the packets having the sequential packet order for sequential processing.

10. The system of claim 9, wherein the one or more instructions, when executed by the one or more processors, configure the one or more processors to:
  identify a sequence number gap in sequence numbers of the packets received in the relaxed order, wherein the sequence number gap indicates one or more packets in the data flow that have not arrived through the ordered multi-path network;
  store the packets received in the relaxed order in a memory buffer according to the sequence numbers leaving a gap in the memory buffer for the one or more packets with sequence numbers in the sequence number gap; and
  deliver the packets having the sequential packet order stored in the memory buffer when the one or more packets with the sequence numbers in the sequence number gap have been received by the packet reassembly module and stored in the memory buffer.

11. The system of claim 9, wherein the one or more instructions, when executed by the one or more processors, further configure the one or more processors to:
  determine whether the packets received in the relaxed order require reassembly based on a tag, protocol type or negotiation credentials; and
  reassemble the packets received in the relaxed order into the sequential order based on the determination.

12. The system of claim 9, wherein the packets received in the relaxed order are associated with a tag that indicates that the packets received in the relaxed order require reassembly.

13. The network interface controller of claim 1, wherein the relaxed order can be negotiated to operate according to one of random selection of a next switch or round robin selection of a next switch.

14. The method of claim 5, wherein the relaxed order can be negotiated to operate according to one of random selection of a next switch or round robin selection of a next switch.

15. The system of claim 9, wherein the relaxed order can be negotiated to operate according to one of random selection of a next switch or round robin selection of a next switch.

* * * * *